(No Model.)
P. BALZ.
Refrigerator.
No. 238,204.   Patented March 1, 1881.
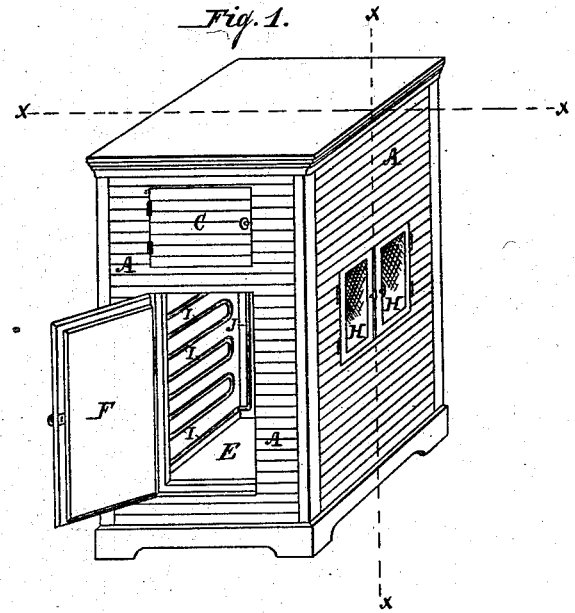
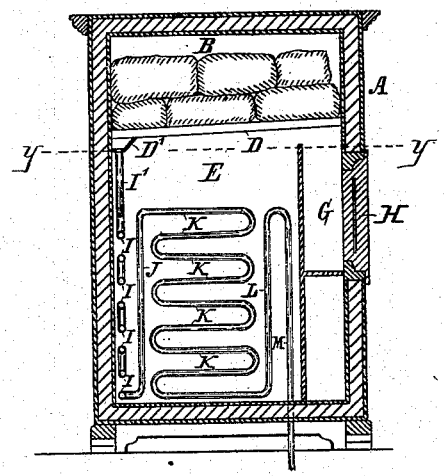
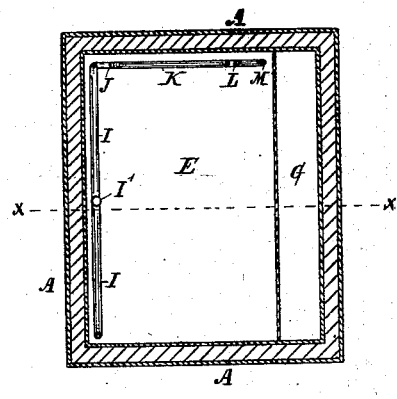
WITNESSES.
James B. Ligius.
R. P. Daggett.
INVENTOR.
Peter Balz,
PER
C. Bradford,
ATTORNEY.

UNITED STATES PATENT OFFICE.

PETER BALZ, OF INDIANAPOLIS, INDIANA.

REFRIGERATOR.

SPECIFICATION forming part of Letters Patent No. 238,204, dated March 1, 1881.

Application filed May 17, 1880. (No model.)

*To all whom it may concern:*

Be it known that I, PETER BALZ, of the city of Indianapolis, county of Marion, and State of Indiana, have invented certain new and useful Improvements in Refrigerators, of which the following is a specification.

The object of my said invention is to improve the construction and increase the efficiency of that class of refrigerators which contain coiled pipes or a series of pipes, and is especially designed for use in the large refrigerators used by butchers, &c. This object is accomplished by arranging within the cooling-compartment of such refrigerators, in combination with the floor of the ice-chamber above, a continuous coil of pipes, in the manner shown and as hereinafter more particularly set forth.

Referring to the accompanying drawings, which are made a part hereof, Figure 1 is a perspective view of a butcher's refrigerator, the door of the cooling-compartment being open to show a portion of the pipes which constitute my improvement; Fig. 2, a longitudinal vertical section thereof on the dotted lines $x$ $x$, and Fig. 3 a horizontal section looking downwardly from the dotted lines $y$ $y$.

In said drawings the portions marked A represent the walls or outer portions of a refrigerator, which may be constructed in the ordinary or any approved manner; B, the ice-receiving portion of the said refrigerator; C, the door thereto; D, the floor which supports the ice, constructed, as usual, to allow a free circulation of air; E, the main cooling-chamber, in which the sides or large pieces of meat are placed; F, the door thereto; G, the smaller compartment, usually provided to receive smaller pieces of meat for the retail trade; H, the doors thereto; I, a series of pipes arranged along a side of the chamber E, and which receive the water formed by the melting of the ice by means of suitable conveyers from the floor D; J, a pipe connected to the bottom of the series of pipes I and rising to a point as high as the top of said series, where it may connect with a discharge-pipe or with a second series of pipes, K; K, a series of pipes similar to the pipes I, arranged along another side of the cooling-chamber; L, a pipe similar to the pipe J, which rises to the top of the series K, where it connects with a discharge-pipe; and M a discharge-pipe, which finally carries the water outside the refrigerator and discharges it into such receptacle as may be provided.

The operation of my refrigerator is as follows: The upper portion or ice-box, B, is charged with ice in the usual manner. As it melts the water formed thereby runs from the floor D into the gutter D', and thence through the pipe I' into the series of pipes I, which it fills, and then runs on through the pipe J into the second series, K, which are filled in like manner, when it finally passes off through the pipe L and the discharge-pipe M. The water which results from the melting of the ice is, of course, very cold, and in circulating through the various pipes imparts an additional coolness to the atmosphere of the cooling-chamber to that imparted by the ice itself. The effect of this is to maintain the required temperature with a less consumption of ice, and thus increase the efficiency and economy in use of the refrigerator.

It is necessary, in order to retain the water in the pipes and keep them full, that the point of discharge should be as high as the top pipe, as shown and before specified.

It is also necessary that the coil of pipes should be continuous from the point where it connects with the ice-floor, or the gutter thereto, to the point of discharge below the floor of the refrigerator; and it is desirable that the floor should slant somewhat, as shown, and that the gutter thereto should be at one side of the cooling-compartment. The pipes should be entirely within the cooling-compartment and uncovered, in order to produce the best results.

Having thus fully described my said invention, what I claim as new, and desire to secure by Letters Patent, is—

1. In a refrigerator, the combination, with the cooling-compartment thereof, of the ice-floor D, arranged to convey the water produced by the melting of the ice to the pipes, and a continuous series of pipes leading therefrom, by which said water is conveyed repeatedly through said cooling-compartment, the last of which said series of pipes rises first to a point above or on a level with the upper pipe of the series, and then to the point of discharge below, all substantially as herein shown and described, and for the purpose specified.

2. The combination, in a refrigerator, of the floor D, the gutter D', the pipe I', and the continuous coil of pipes I, J, K, L, and M, when all constructed, arranged, and operating substantially as herein shown and described, and for the purpose specified.

In witness whereof I have hereunto set my hand and seal at Indianapolis, Indiana, this 13th day of May, A. D. 1880.

PETER BALZ. [L. S.]

In presence of—
 HENRY KALLE, Jr.
 C. BRADFORD.